Dec. 2, 1969 L. S. COSENTINO ET AL 3,482,220

CRYOELECTRIC MEMORIES

Filed Aug. 26, 1966 2 Sheets-Sheet 1

INVENTORS
LOUIS S. COSENTINO &
WILBER C. STEWART
BY Samuel Cohen
Attorney

INVENTORS
LOUIS S. COSENTINO &
WILBER C. STEWART
BY Samuel Cohen
Attorney

United States Patent Office 3,482,220
Patented Dec. 2, 1969

3,482,220
CRYOELECTRIC MEMORIES

Louis S. Cosentino, Belle Mead, and Wilbur C. Stewart, Hightstown, N.J., assignors to RCA Corporation, a corporation of Delaware Filed Aug. 26, 1966, Ser. No. 575,378
Int. Cl. G11b 9/00, 9/04
U.S. Cl. 340—173.1 10 Claims

ABSTRACT OF THE DISCLOSURE

A circuit for reducing the transients which develop across a sense line during the write cycle of a cryoelectric memory. An auxiliary line is employed which is coupled in one sense to one group of the storage loops and in the opposite sense to the remaining storage loops. The write current may be applied to the serially connected loops and the sense signal taken from the auxiliary line or vice-versa.

This invention relates to cryoelectric memories and, more particularly, to an improved arrangement for reducing the effect of transients due to the write current, for increasing the magnitude of the stored persistent current, and for increasing the amplitude, both relative and absolute, of the memory sense signals.

A cryoelectric memory of known design includes a plurality of superconductor loops which can store persistent currents, each such loop defining a memory location. The loops are connected in series and this series circuit is employed as a sense line. A matrix of *a* and *b* drive wires is arranged to cross over the respective loops.

To write information into a selected loop, drive currents are applied concurrently to an *a* wire and a *b* wire which cross at this loop and write current is applied to the sense line. The amplitudes of the currents applied to the *a* and *b* wires are such that a portion of the selected loop is driven normal. When these *a* and *b* drive currents are removed, flux due to the write current applied to the sense line is trapped in the selected, now superconducting, loop and when the write current is subsequently removed, this flux is stored in the form of a persistent current.

The sense line consisting of the serially connected loops exhibits a substantial inductance, and each time write current is applied to the sense line, a voltage transient develops across this inductance. This transient is many times larger than the sense signal produced during the following read cycle and it is therefore necessary to wait for the transient to decay before the following read cycle can be started. This waiting period is undesirable because it limits the operating frequency (increases the read/write cycle time) of the memory.

In the arrangement of the present invention, the effect above is substantially lessened. An auxiliary sense line is employed which is separate from the serially connected loops and which is inductively coupled to one group of approximately one-half of the loops in one sense and to the remaining loops in the opposite sense. So connected, transients are still generated in response to a write current, however, they are of opposite polarity and tend to cancel. This permits the read cycle of the memory to start almost immediately upon the termination of the write cycle without danger that the sense signal will be masked. The arrangement also has a number of other advantages which are discussed in greater detail below.

The invention is shown in the following drawings of which:

In the discussion which follows, a cryogenic environment for the memory plane and certain other components is assumed. This may be achieved by immersing the memory plane in a liquid helium bath, as is well understood in the art.

Figures 1, 2, 3, 4, 5:
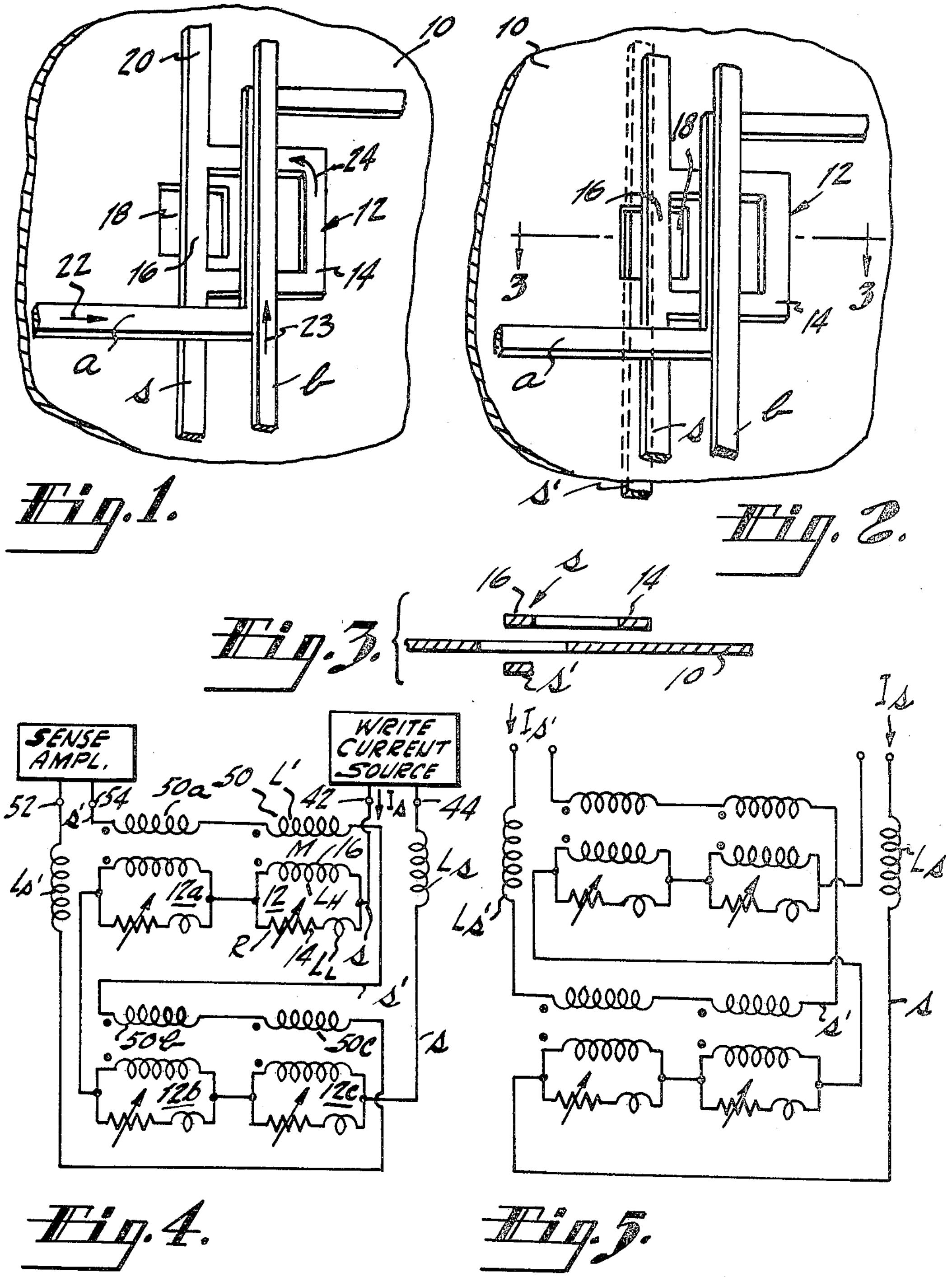
FIGURE 1 is a perspective, schematic showing of a known cryoelectric memory element.
FIGURE 2 is a perspective, schematic showing of a memory element according to the present invention.
FIGURE 3 is a cross-section taken along line 3—3 of FIGURE 2.
FIGURE 4 is an equivalent circuit of a 2 x 2 memory array according to the invention.
FIGURE 5 is an equivalent circuit of a 2 x 2 memory array according to another embodiment of the invention.

The known memory element of FIGURE 1 includes a ground plane 10 which may be formed of a superconductor such as lead and a sense line *s* formed of a superconductor such as tin. The sense line includes a loop 12 which has two parallel current paths 14 and 16. The path 16 is located over a hole 18 in the ground plane. There are two drive lines *a* and *b*, formed of superconductors such as lead, which pass over the loop. These lines are insulated from one another, from the ground plane, from the sense line *s* and from loop 12. The loop is also insulated from the ground plane 10. The insulation may be a thin-film of silicon monoxide or the like. For the sake of drawing clarity, the insulation is not shown.

To write information into the memory cell of FIGURE 1, write current is applied to the sense line *s* and drive currents are applied to lines *a* and *b*. The write current may be applied in the direction of arrow 20 or in the opposite direction. The major portion of this current tends to flow in leg 14 of the loop rather than leg 16, as leg 16 exhibits greater inductance than leg 14. This greater inductance is achieved by the absence of the ground plane beneath leg 16.

The drive currents, which may be applied in the direction of arrows 22 and 23, for example, cause magnetic fields to be produced which are additive in the region where the two lines "intersect," that is, where they lie over one another. The current amplitudes are so chosen that the presence of a single drive current does not affect the superconducting state of the tin line or the loop 12. However, when both drive currents are present, the combined magnetic field produced by the two lines is sufficient to drive the two portions of tin loop 12 which lie beneath the *a* and *b* lines, to the normal (resistive) condition. When this occurs, the current 20 steers into the higher inductance leg 16 in preference to leg 14, as leg 16 remains in a condition of zero resistance.

If now the drive currents *a* and *b* are removed, the two portions of tin loop 12 return to the superconducting state and the flux of the sense line current in path 16 is trapped by loop 12. Subsequently, the write current indicated by 20 is removed, and the tendency of the magnetic flux to collapse induces a current in loop 12. This current is persistent due to the zero resistance of loop 12, and supports the flux trapped therein. The persistent current will circulate around loop 12 in the counterclockwise direction, as indicated by arrow 24.

The data represented by the stored persistent current may be "read-out" of the loop by applying read currents to the *a* and *b* drive lines, as indicated by arrows 22 and 23, in the absence of current in the sense line. These drive the two portions of path 14 normal, again at the regions beneath the *a* and *b* drive lines. The current which decays through these normal areas causes a voltage to develop across the paths 14, 16 which may be detected as a sense voltage across the outer terminals of the sense line.

Figure 7:
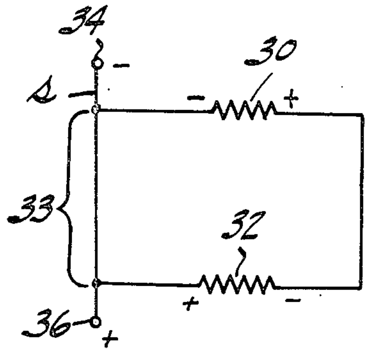
FIGURE 7 is a schematic showing to explain how the sense signal develops in the circuit of FIGURE 1.

The above is illustrated schematically in FIGURE 7. The resistors 30 and 32 represent the normal areas created when the coincident read currents are applied to the *a* and *b* lines (these lines are not shown in FIGURE 7). The sense voltage develops across these resistors in the polarity indicated. The portion 33 of the loop acts like an inductance and the sense voltage therefore appears across this inductance and across the terminals 34 and 36 of the sense line. This voltage is relatively positive at terminal 36 and relatively negative at terminal 34.

A disadvantage of a memory made of cells such as shown in FIGURE 1 is the undesired transients which build up across the sense line during the write interval. This is illustrated in the schematic showing of FIGURE 8. The write current applied to the sense line is shown as $I_s$. The loops 12 are each illustrated as two inductors in parallel. (The resistance present in a loop when it is driven to the normal state by coincident drive currents is not illustrated in FIGURE 8 nor are the *a* and *b* drive lines.) The inductance associated with the line due to the line length is illustrated as $L_s$.

Figure 8:
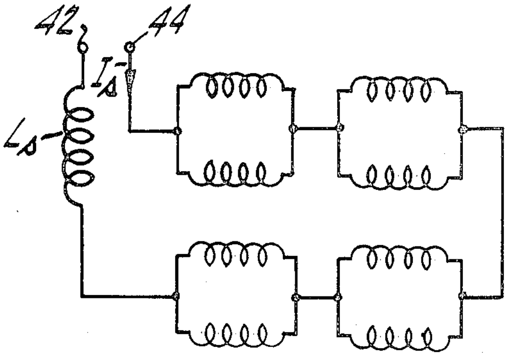
FIGURE 8 is an equivalent circuit of a 2 x 2 memory employing cells such as shown in FIGURE 1.

As is clear from FIGURE 8, each and every loop develops a voltage across the two inductors making up the loop which is equal to $Ldi/dt$, where L is the effective value of the two parallel inductances and $di/dt$ is the change in write current $I_s$ with time. In addition, a voltage $L_s di/dt$ builds up across the inductor $L_s$. The voltages across the respective loops are additive, and the total of these voltages and that across $L_s$ appears as a transient across terminals 42, 44 of the sense line. This transient persists in the sense circuits connected to terminals 42, 44 after the write current $I_s$ disappears and it is necessary to wait until the transient decays to less than a predetermined value before any storage location (any loop) may be read out.

An improved memory cell according to the present invention is shown in FIGURE 2. It is essentially identical to the cell of FIGURE 1 except for the addition of an auxiliary sense winding *s'*. This sense winding is located beneath the ground plane 10 and is aligned with the sense line *s* and the high inductance portion 16 of the loop 12. The auxiliary sense line *s'* is insulated from the ground plane and from the sense line *s* and is preferably of the same width as the sense line *s*.

FIGURE 4 is an equivalent circuit of a 2 x 2 memory made up of cells according to the present invention. The four loops **12, 12*a*, 12*b* and 12*c*** are connected in series and each loop is assumed to have identical circuit parameters. Each loop includes a high inductance leg $L_H$, a low inductance leg $L_L$ and a resistor R. The resistor R is shown to be variable. It normally has the value zero, however, when the low inductance leg of the loop is driven to the normal state, it has some finite value. The distributed inductance, the value of which is a function of the length of the sense line *s*, is shown as $L_s$.

Figure 9:
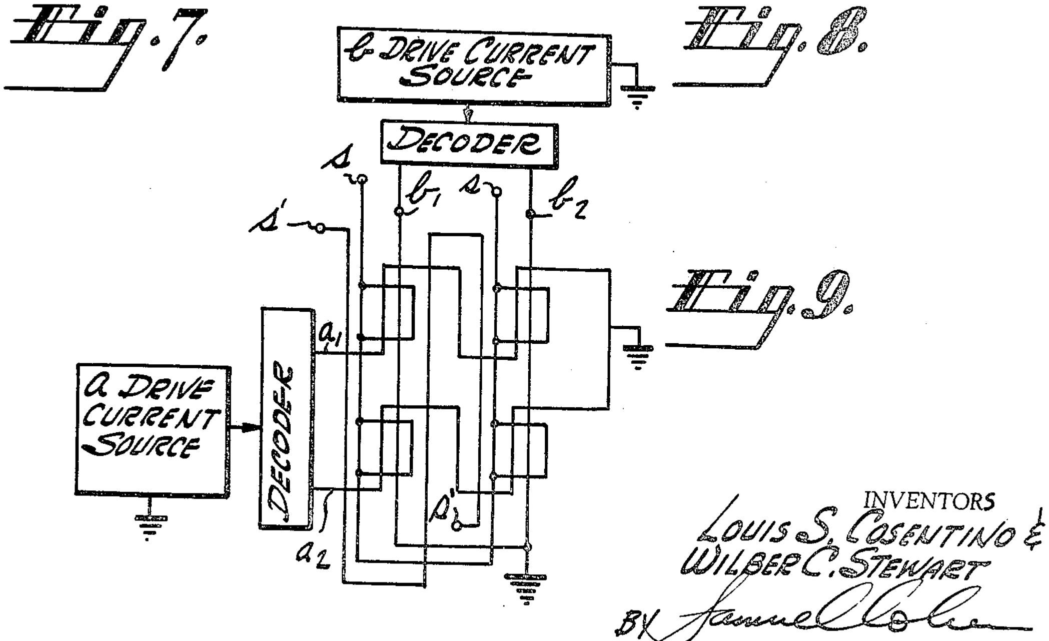
FIGURE 9 is a schematic showing of the 2 x 2 array of FIGURE 4 with the *a* and *b* drive lines present.

The equivalent circuit of the auxiliary sense line *s'* is shown to comprise four series connected inductors **50, 50*a*, 50*b* and 50*c*** and a fifth inductor $L_{s'}$ representing the distributed auxiliary sense line inductance due to the line length. Each inductor has a value L' approximately equal to $L_H$ and there is mutual coupling represented by M between each loop inductance $L_H$ and the corresponding inductor L'. The *a* and *b* drive lines are not shown in FIGURE 4, however, they are illustrated in FIGURE 9.

The auxiliary sense line *s'* is so arranged that any transients induced by the write current $I_s$ applied to the sense line cancel at line *s'*. The reason is that the transient voltages induced across two of the inductors L' is of opposite polarity to the transient voltages induced across the other two inductors L'. Thus, in the circuit illustrated in FIGURE 4, the transient voltages induced across inductors **50*a* and 50 are of one polarity and the transient voltages induced across the inductors 50*b* and 50*c* are of opposite polarity so that the net effect of these four voltages at terminals 52 and 54** is zero volts.

The only voltage remaining at the output terminals 52 and 54 of the sense line *s'* is the voltage coupled into the inductance L' of the one cell into which information is being written. This voltage does not occur because of a change in write current $I_s$ with time, but rather is associated with the steering of the write current into the high inductance leg of the selected cell. Accordingly, the readout cycle may start immediately after information is written into a memory location.

The readout of information may be accomplished in exactly the same way as in the memory element of FIGURE 1. Coincident currents are applied to a pair of selected *a* and *b* lines (not shown in FIGURE 4) to drive a portion of a selected loop normal. The voltage thereby developed across the inductance $L_H$ of this loop is coupled by mutual inductance to the corresponding inductor L' of the auxiliary sense line *s'*. This occurs at only a single cell so that this voltage is present at the output terminals 52, 54.

The operation of the memory of FIGURE 4 has been described in terms of writing information via the sense line *s* and reading out information via sense line *s'*. In the arrangement shown, the line *s* is substantially shorter than the line *s'* so that the inductance $L_s$ is smaller than the inductance $L_{s'}$. Accordingly, it is preferable, in the arrangement of FIGURE 4, to operate the memory in an alternative way.

In this alternative method of operation, during the write-in interval, coincident currents are applied to a selected *a* line and a selected *b* line (not shown in FIGURE 4) and to the *s'* line. One memory location exists at which the *a* and *b* drive currents and the flux due to the write current in the *s'* line are present at the same time and a portion of the loop at that location is driven normal. Then, the *a* and *b* drive currents are removed and the current $I_{s'}$ is removed and the memory location formerly driven normal returns to the superconducting state and stores a persistent current. The readout cycle is the same as already discussed, however, the sense voltage is sensed at terminals 42, 44 rather than terminals 52, 54.

The advantage of operating the particular memory configuration shown in this way is that there is less attenuation of the sense signal by the inductance $L_s$ than there would be by the larger inductance $L_{s'}$.

In the memory arrangement of FIGURE 5, the sense line *s* is longer than the auxiliary sense line *s'*. Accordingly, it is preferable to operate this circuit in the first manner discussed, that is, by applying the write current to the sense line *s* and reading out the sense voltage across the auxiliary sense line *s'*.

Note that in the arrangement of FIGURE 5, just as in the arrangement of FIGURE 4, extraneous transients, due to the write current, are eliminated. This is so because, just as in the circuit of FIGURE 5, the loops are arranged in pairs, and the transient voltage developed across one loop of each pair is of the same amplitude as and of opposite polarity to the transient voltage developed across the other loop of that pair.

Figure 6:
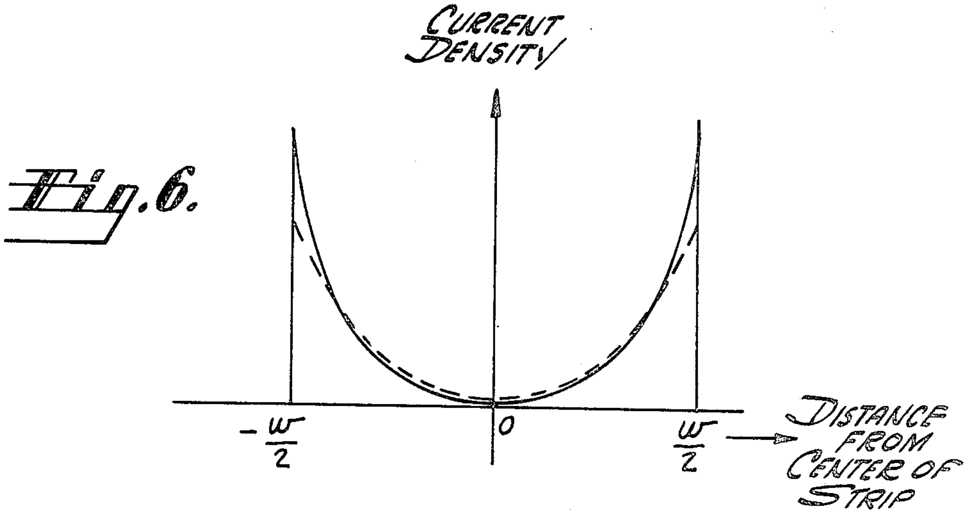
FIGURE 6 is a graph to help explain one of the advantages of the present invention.

The absolute amplitude of the sense signal produced by a storage loop such as 12 of FIGURE 2 is a function, among other things, of the amount of persistent current stored in the loop. The magnitude of the latter, in turn, depends upon the write current amplitude. The present arrangement permits a substantial increase in write current to be achieved for reasons discussed below in connection with FIGURE 6.

The solid line shows the current distribution during the write interval and in the absence of the auxiliary sense line $s'$, across the width $w$ of the unshielded portion of leg 16 of the loop 12. The current carriers distribute non-uniformly across the width $w$ of the line 16 and significantly more carriers are present at the edges of the line than at the center of the line.

When the line $s'$ is present, it provides some shielding for the line $s$ and the current distribution across the line $s$, while still peaking at the edges of the line, is more uniform than (the peaks are considerably lower than) in the previous case. This is illustrated by the dashed curve in FIGURE 6. This makes it possible substantially to increase the amount of write current applied to line 16 without driving the line 16 to the normal (resistive) state. It is found, in practice, that the write current carrying capacity of the line $s$ is actually increased by at least a factor of 2 (and the sense signal amplitude increased correspondingly) in the presence of the auxiliary line $s'$ over what it is in the absence of the auxiliary line $s'$.

One objective of placing a hole in the ground plane at each storage location is to produce a sense voltage of relatively high amplitude. This sense voltage is roughly proportional to the inductance $L_H$ of leg 16 so that the higher the inductance, the greater the amplitude of the sense signal. It is found, in practice, that the auxiliary sense line $s'$ does not appreciably reduce this value of inductance even though it does make the current carrier distribution in the line 16 more uniform, as already discussed. The reason is that the value of inductance varies somewhat non-linearly with the size of the aperture 18 and is also dependent upon the shape of the aperture. The presence of the line $s'$ while reducing the effective size of the aperture, and changing the effective shape of the aperture, does so in a region of the non-linear inductance characteristic such that the inductance is not changed to any great extent.

Through observation, it is believed that the optimum width of the line $s'$ is equal to that of the line $s$. As the line $s'$ should always remain in the superconducting state, it is preferable to make this line of a material such as lead or a similar superconducting material.

While the invention has been described in terms of a particular type of loop storage cell, it is to be understood that the principles set forth are applicable to many other types of cells as well. For example, they are applicable to other memory arrangements in which the loops are arranged in a plane parallel to the ground plane and also to memory arrangements in which the loops are perpendicular to the ground plane. The latter type of cells, known as "bridge" cells, are discussed in the May 16, 1966 issue of Electronics, pages 148 and 149.

What is claimed is:

1. In a cryoelectric memory:
- a plurality of superconducting storage loops for storing persistent currents, connected in series;
- means coupled to said loops for inducing disturb voltages of the same polarity across the loops, whereby the total disturb voltage developed across the series connected loops is substantially greater than that developed across any single loop; and
- a superconducting line inductively coupled in one sense to one group of the loops to receive inductively coupled disturb voltages of one polarity and in an opposite sense to the remaining loops to receive inductively coupled disturb voltages of opposite polarity.

2. In a memory as set forth in claim 1, said line being coupled to a group comprising one-half of the loops in one sense and to the remaining loops in the opposite sense.

3. In a memory as set forth in claim 1, further including:
- means for driving a portion of one loop to the normal state;

- means for applying write current to the series circuit during the time said one loop is in the normal state; and
- means for detecting a sense voltage across said line during a subsequent time interval.

4. In a cryoelectric memory:
- a matrix of $a$ and $b$ drive wires which cross one another at a plurality of memory locations and which are insulated from one another where they cross;
- a plurality of superconducting storage loops, one located at each memory location, said loops being connected in series to form a first winding;
- a second winding inductively coupled in one polarity to approximately one-half of the storage loops and inductively coupled in the opposite polarity to the remaining storage loops, one of said second and first winding serving as a sense winding and the other as a drive winding;
- means for writing information into a given storage location comprising means for applying coincident currents to a selected $a$ wire and a selected $b$ wire and, during the application of said coincident currents, applying a write current to said drive winding, the coupling between said second winding and loops being such that said write current produces disturb voltages all of the same polarity across said drive winding having a total amplitude substantially greater than that of the disturb voltage across any loop, whereas the disturb voltages induced in said sense winding are of one polarity for one group of loops and of opposite polarity for said other group of loops and tend to cancel; and
- means for reading information from a memory location comprising means for applying coincident currents to a selected $a$ wire and a selected $b$ wire and means coupled to said sense winding for sensing the voltage thereacross.

5. The memory set forth in claim 4, wherein each loop comprises a relatively high inductance leg in parallel with a relatively low inductance leg.

6. The memory set forth in claim 5, further including a superconductor ground plane formed with apertures therein, said loops being located on and insulated from one surface of said ground plane, each said relatively high inductance leg lying over an aperture, and wherein said second winding lies on and is insulated from the other surface of said ground plane and is aligned with said high inductance legs.

7. The memory set forth in claim 4, wherein said means for writing information into a given storage location includes means for applying a write current to said first winding, and said means for reading information from a memory location includes means for sensing the voltage across said second winding.

8. The memory set forth in claim 4, wherein said means for writing information into a given storage location includes means for applying a write current to said second winding, and said means for reading information from a memory location includes means for sensing the voltage across said first winding.

9. A superconducting memory element comprising, in combination:
- a superconductor ground plane formed with an aperture therein;
- a storage loop having first and second current carrying paths connected in parallel, said loop lying on and insulated from one surface of said ground plane and at least one portion of said first path lying over said aperture;
- an auxiliary line lying on and insulated from the other surface of said ground plane, said auxiliary path passing over said aperture and aligned with said one portion of said first path; and
- crossing $a$ and $b$ drive lines electrically coupled, where they cross, to the second path, the portions of said lines which cross being insulated from one another, from the ground plane, and from the loop.

10. A memory element as set forth in claim 9, wherein the storage loop is made of a superconductor which can be driven to the normal state by a relatively low value of magnetic field and the remaining lines and the ground plane are made of a superconductor which requires a relatively higher value of magnetic field to be driven to the normal state.

References Cited

UNITED STATES PATENTS

| | | | |
|---|---|---|---|
| 3,065,459 | 11/1962 | Hunter | 340—173.1 |
| 3,191,160 | 6/1965 | Alphonse | 340—173.1 |
| 3,259,887 | 7/1966 | Garwin | 340—173.1 |

TERRELL W. FEARS, Primary Examiner

U.S. Cl. X.R.

307—245